United States Patent [19]

Guarr

[11] Patent Number: 4,498,614
[45] Date of Patent: Feb. 12, 1985

[54] STORAGE DEVICE FOR SPARE TIRE

[76] Inventor: David Guarr, 6130 Westgate, Shawnee, Kans. 66216

[21] Appl. No.: 507,132

[22] Filed: Jun. 23, 1983

[51] Int. Cl.³ .............................................. B60R 11/06
[52] U.S. Cl. ..................................... 224/273; 70/163; 70/232; 70/258; 70/259; 224/42.24; 224/42.25
[58] Field of Search ............... 224/42.25, 42.12, 42.24, 224/42.2, 273; 70/158, 259, 229, 232, 258, 163; 301/37 AT; 150/52 A, 52 B

[56] References Cited

U.S. PATENT DOCUMENTS

| | | | |
|---|---|---|---|
| 2,043,872 | 6/1936 | Wise | 70/232 |
| 2,108,145 | 2/1938 | Short | 150/54 A X |
| 2,181,828 | 11/1939 | Ingwer et al. | 70/232 |
| 2,493,366 | 1/1950 | Simcich | 70/259 X |
| 2,995,402 | 8/1961 | Lyon | 70/259 |
| 3,894,668 | 7/1975 | Chapman et al. | 224/42.24 X |
| 4,161,869 | 7/1979 | Dixon | 301/37 AT X |

Primary Examiner—Allan N. Shoap
Attorney, Agent, or Firm—Kokjer, Kircher, Bradley, Wharton, Bowman & Johnson

[57] ABSTRACT

A storage device which fits within the rim of a spare tire and can be locked to secure its contents against unauthorized access and to lock the spare tire itself. A pan shaped container has a closed bottom which is secured to the hub of the wheel by the same fasteners that mount the spare wheel to its mounting bracket on the exterior of the vehicle. The interior of the container provides a storage compartment for tools and other articles. A removable cover panel encloses the storage compartment and can be locked in place on the container by a key operated cylinder lock. The storage device can be used with a flexible tire cover which covers the spare tire and is secured to the cover panel of the container by the cylinder lock in cooperation with a large washer.

19 Claims, 4 Drawing Figures

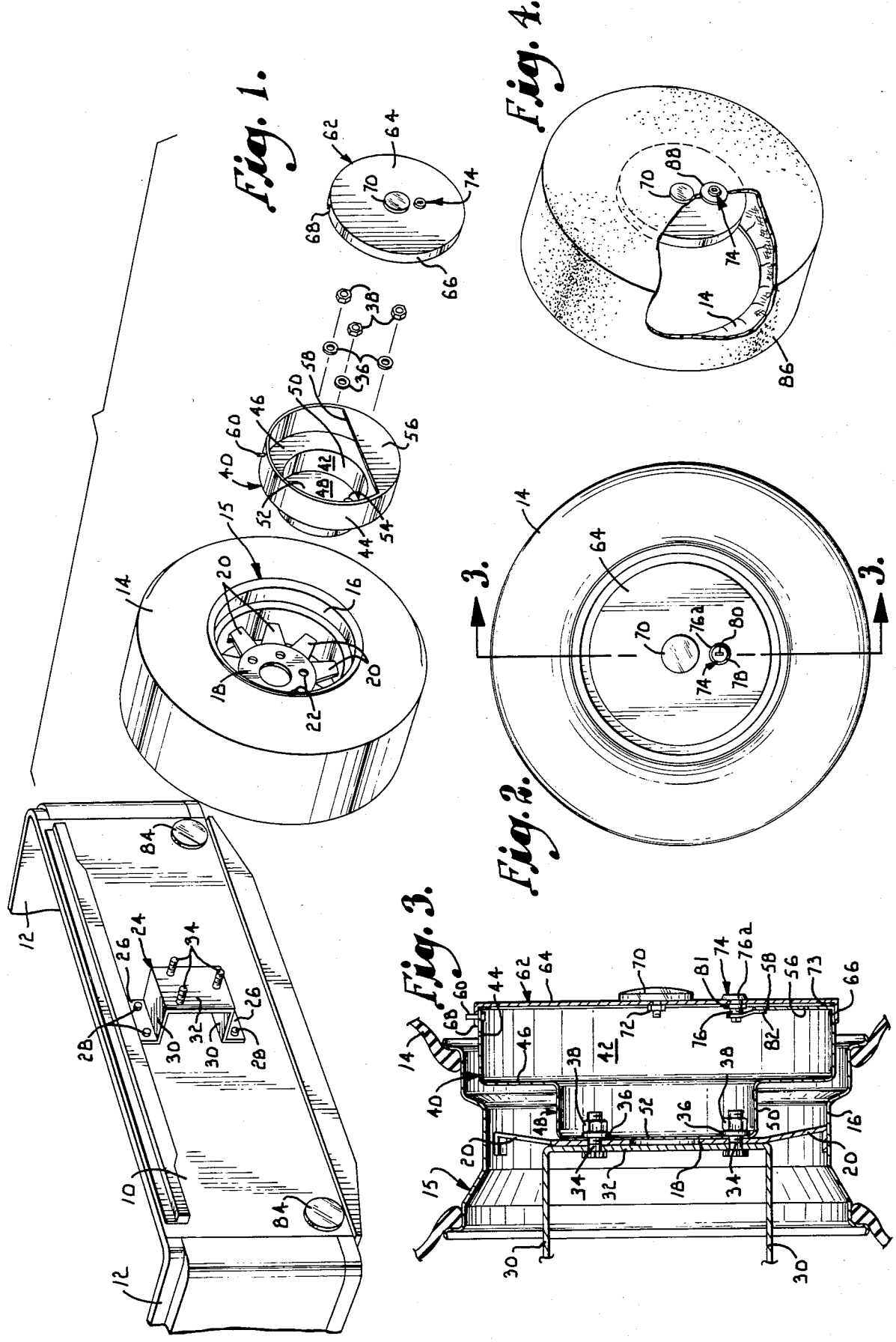

STORAGE DEVICE FOR SPARE TIRE

BACKGROUND AND SUMMARY OF THE INVENTION

This invention relates generally to storage devices and more particularly to a storage container that can be installed on a spare tire and locked to secure its contents against unauthorized access and to lock the spare tire itself.

Various types of recreational vehicles, vans, and topless or cloth topped vehicles such as JEEP vehicles commonly have spare tires which are mounted on the exterior of the vehicle. Exterior mounting of the spare tire increases the available interior space which is usually at a premium. Nevertheless, there is often a lack of adequate storage space for carrying of camping gear, tools and other objects. The same is true for deck-mounted spares in "hatchback" automobiles, trunk-mounted spares in sedans, and inside spares in vans and utility vehicles.

One known device that attaches to an exterior spare tire is essentially an oversized tire cover which covers the spare tire and has enough additional room to provide a storage compartment for carrying various articles. This type of device is lacking somewhat in security in that the storage compartment can be opened simply by manipulating a zipper or similar fastener. Also, the oversized tire cover is so large that it adds undue bulk to the spare tire area on the rear of the vehicle, and its size also adds to the difficulty involved in applying it to and removing it from the tire.

The present invention is directed to an improved storage device which is mounted on the exterior spare tire of a vehicle and which may be locked to secure its contents and to secure the spare tire itself. In accordance with the invention, a hollow container is bolted in place within the rim of the spare tire by the same nuts and bolts that are used to mount the spare tire on the vehicle. The container provides a storage compartment that may be closed by a cover and locked by a key operated cylinder lock. To remove the cover and gain access to the storage compartment and its contents, it is necessary to open the lock with the correct key.

The storage unit does not project significantly beyond the spare tire and efficiently utilizes the space within the rim of the spare tire. Consequently, undue bulk is not presented and the storage unit has an attractive appearance. At the same time, a flexible tire cover can be used to cover the tire and the storage device. The tire cover can be locked on the tire by the cylinder lock in combination with a large washer or the like applied to the outside surface of the tire cover. A reflector can be mounted on the outside of the tire cover to additionally fasten the tire cover to the storage unit. For economy and simplicity, it is preferred that the storage unit be mounted by the same fasteners that are used to secure the spare tire to its mounting bracket, although other mounting arrangements can be employed.

It is an important object of the invention to provide a storage device which can be conveniently mounted to a spare tire. Preferably, the storage container is mounted within the rim of the spare tire to take advantage of the otherwise wasted space within the rim.

Another object of the invention is to provide a storage device which can be locked in the closed position to secure its contents against unauthorized access.

Yet another object of the invention is to provide a storage device having adequate capacity to carry towing straps, tool kits, jumper cables and similar items.

Yet another important object of the invention is to provide a storage device of the character described which also serves to lock the spare tire and wheel assembly in place.

A further object of the invention is to provide a storage device of the character described which is constructed to accommodate a flexible tire cover and to lock the tire cover in place covering the spare tire.

An additional object of the invention is to provide a storage device that is useful with spare tires having various sizes and styles.

A still further object of the invention is to provide a storage device of the character described which is constructed in a simple and economical manner.

Other objects of the invention are to provide a storage device of the character described which protects the spare wheel from the effects of weather, road grime and the like and which adds a refector to the rear of the vehicle for improved visibility of a rear-mounted spare tire.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is an exploded perspective view showing an exteriorly mounted spare tire and a storage device for installation thereon in accordance with a preferred embodiment of the present invention;

FIG. 2 is a rear elevational view showing the storage device installed on the spare tire;

FIG. 3 is a fragmentary perspective view taken generally along line 3—3 of FIG. 2 in the direction of the arrows; and FIG. 4 is a perspective view showing the storage device used with a flexible tire cover which covers the spare tire, with a portion of the tire cover broken away for illustrative purposes.

Referring now to the drawing in more detail and initially to FIG. 1, numeral 10 designates the tailgate of a vehicle having opposite side walls 12. The vehicle may be a recreational vehicle, a van, or a topless or cloth topped vehicle (such as a JEEP vehicle) having an exteriorly mounted spare tire 14. The tire 14 is mounted in the usual manner on a wheel 15 having a rim 16 and a flat central hub 18 connected to the rim by spokes 20. The hub 18 includes a plurality of bolt holes 22 for receiving the bolts that are used to mount the wheel on the axle of the vehicle.

The spare tire assembly can be mounted on the exterior or interior of the vehicle in a number of different ways. One exterior mounting arrangement that can be used employs a U-shaped bracket 24 having a pair of flanges 26 secured to the tailgate 10 by bolts 28 or in any other suitable manner. The bracket includes a pair of legs 30 which extend outwardly from the flanges 26. The tire is mounted to a central plate 32 which extends between the legs 30 of the bracket. Three bolts 34 project rearwardly from plate 32 and extend through bolt holes 22 of the hub. Washers 36 and nuts 38 are then applied to the bolts 34 in order to secure the spare tire in place.

In accordance with the present invention, a storage device is installed on the spare tire to provide a storage compartment for carrying various items such as tow straps, tools, jumper cables and other gear. The storage device includes a metal container 40 having a hollow pan-like body which presents a storage compartment 42 within its hollow interior. The main body of container 40 has a cylindrical wall 44 which is open on its outer end. The inner end of the wall 44 connects with an annular surface 46 which extends inwardly from the outer wall 44. At the bottom of container 40, a central well 48 is formed and includes a cylindrical wall 50 extending from surface 46. A flat circular bottom panel 52 provides a solid bottom of the well which closes the end of container 40 opposite the open end.

The container 40 is small enough to fit within the wheel rim 16, as best shown in FIG. 3. The stepped configuration of the container conforms with the stepped shape presented by many wheel rims. The bottom panel 52 is provided with three holes 54 having the same spacing and pattern as the bolts 34 which project from bracket 24. The pattern of holes 54 also conforms with three of the bolt holes 22 in the wheel.

The open outside end of container 40 is provided on its lower portion with a small plate 56 having a free upper edge 58. Plate 56 may be welded or otherwise secured to the front edge of the main wall 44. Plate 56 assists in retaining objects within the storage compartment 42 and also facilitates locking of the storage device, as will be explained more fully. A small stud 60 extends upwardly from the top of the side wall 44.

The storage device includes a cover 62 which may be applied to the container 40 in order to close the outer end of the container, thereby enclosing the storage compartment 42 and its contents. The cover 62 is preferably constructed of metal and includes a circular panel 64 having a peripheral flange 66 thereon. The flange 66 overlaps the side wall 44 and is provided with a notch 68 for registration with the stud 60. A reflector 70 is secured to the center of the cover panel 64 by a suitable fastener 72 such as a nut threaded into a stud projecting from the center of the reflector. The inside surface of panel 64 is provided with a gasket 73 (FIG. 3) on its peripheral region inside of the flange 66 for sealing against the outer edge of the container 40.

The cover 62 is locked in place on the container 40 by a key operated cylinder lock 74. With particular reference to FIGS. 2 and 3, the cylinder lock includes an outer cylinder 76 which receives a plug 78 having a key hole slot 80. The cylinder 76 is secured to the cover panel 64. An enlarged head 76a of the cylinder contacts the outside surface of panel 64, and a nut 81 is threaded onto the cylinder and tightened against the inside surface of the cover panel.

The plug 78 is located to extend past and slightly above the upper edge 58 of plate 56 when the cover is in place on container 40. The end of plug 78 carries a locking bar 82 which rotates with the plug. When the plug is in the locking position shown in FIG. 3, bar 82 fits closely behind the upper edge portion of plate 56 to lock the cover on the container. Plug 78 can be rotated 180° to a release position in which bar 82 extends upwardly from the plug and is released from plate 56.

The storage device can be installed on the spare tire assembly by applying the wheel to its mounting bracket 24 with bolts 34 extending through the bolt holes 22 in hub 18. Container 40 is then inserted within the rim 16 such that the bottom panel 52 engages hub 18 with the bolts 34 extending through the bolt holes 54 in the bottom panel. Washers 36 and nuts 38 are then applied to bolts 34 to secure the spare tire on the vehicle and to secure container 40 within rim 16.

Articles such as tow straps, tools and tool sacks, jumper cables and the like can then be inserted into the storage compartment 42 presented within the container. The gasket 73 seals the container and keeps out moisture, dirt and other foreign materials. Cover 62 is applied to container 40 with bar 82 rotated approximately 180° from the locking position shown in FIG. 3. The cylinder lock 74 is then in the release position, and the cover can be applied to the container with flange 68 overlapping the side wall 44 and bar 82 clearing edge 58 of plate 56. In order to apply the cover, it is necessary to align notch 68 with stud 60, and this properly locates the cylinder lock with respect to plate 58 so that the locking bar 82 can interlock with plate 56.

Once the cover has been applied, the key is turned in the key hole slot 80 in order to rotate plug 78 and the locking bar 82 to the position of FIG. 3. The locking bar then fits closely behind the upper edge portion of plate 56 to lock the cover in place on the pan. The key can then be removed. In order to open the storage device and gain access to the contents of the storage compartment 42 (and the mounting hardware for the spare tire assembly), it is necessary to insert the correct key in the key hole slot 80 and turn it to rotate bar 82 to the unlocked position where it is free from the plate 56. Cover 62 can then be freely removed from container 40.

It is noted that the storage device does not project significantly beyond the tire 14 and is thus relatively unobtrusive. Preferably, the container 40 and cover 62 are painted to blend in with the tire assembly in order to make the storage device attractive and inconspicuous. When the cover is in place, the storage device appears simply as a disk in the center of the spare tire. The reflector 70 cooperates with existing reflectors on the vehicle such as those indicated at 84 in FIG. 1.

Referring now to FIG. 4, the storage device of the present invention can be used in combination with a flexible tire cover 86 which serves to cover the spare tire assembly. If it is desired to use the tire cover 86, the cylinder lock 74 preferably extends through both the tire cover 86 and the cover panel 64. The cylinder lock 74 is fitted with a large flat washer 88 which is held against the outside surface of the tire cover by the enlarged head 76a of the lock. The tire cover 86 is thereby attached to the container cover 62 since the washer 88 prevents the tire cover from being removed. The cylinder lock also locks the tire cover 86 to the tire assembly since it is necessary to unlock the container cover 62 before the tire cover can be removed. The reflector 70 is mounted on the outside of the tire cover by extending its fastener 72 through both the tire cover and the container cover.

It is to be understood that the storage device can be mounted in other manners. For example, if the spare tire is mounted in an alternative fashion such as by means of a hanger bracket and a plate tightened down against the wheel by a wing nut, a bracket similar to the U-shaped bracket 24 can have its flanges bolted to the hub of the wheel and the container 40 can be bolted to the central plate portion of the bracket. Other mounting arrangements for the container are also possible.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A storage device for installation on a spare tire assembly mounted on the exterior of a vehicle, said device comprising:
   a rigid container having a hollow interior presenting a storage compartment and an open end providing access to said storage compartment, said container including a generally cylindrical wall adjacent said open end;
   means for securing said container to said spare tire assembly with said open end at an accessible location;
   a cover for said container having a size to cover the open end thereof to enclose said storage compartment, said cover including a generally circular cover panel and a peripheral flange on said cover panel overlapping said wall of the container when the cover is applied to the open end of said container; and
   means for locking said cover on said container in position to cover said open end, whereby to enclose said storage compartment and the contents thereof.

2. The device of claim 1, wherein said locking means is key operated.

3. The device of claim 1, wherein said container includes:
   a main body portion having said generally cylindrical wall; and
   a well portion smaller than said main body portion and having a second generally cylindrical wall and a flat bottom.

4. The device of claim 3, wherein:
   said spare tire assembly includes a wheel having a rim and a hub; and
   said securing means is operable to secure said flat bottom to said hub to mount said body portion and well at a location generally within said rim.

5. The device of claim 1, including a flexible tire cover for covering the spare tire assembly, said locking mans being operable to lock the tire cover on the spare tire assembly.

6. The device of claim 1, including:
   a plate on said container adjacent the open end thereof, said plate presenting a free edge portion; and
   a locking element on said locking means engageable with said plate adjacent the free edge portion thereof to lock said cover on the container when said locking means is in a locking condition.

7. The device of claim 6, including means on said container and cover cooperating to position said cover on the open end of said container at a preselected orientation to locate said locking element at a preselected position for engagement with said plate.

8. A storage device for installation on a spare tire assembly mounted on the exterior of a vehicle and having a wheel rim, said device comprising:
   a rigid container having a hollow interior presenting a storage compartment and an open end providing access to said storage compartment, said container including a generally cylindrical wall adjacent said open end and said container having a size and shape to fit closely within the wheel rim;
   means for securing said container to said spare tire assembly at a location within the wheel rim and with said open end at an accessible location;
   a cover for said container having a size to cover the open end thereof to enclose said storage compartment, said cover including a generally circular cover panel and a peripheral flange on said cover panel overlapping said wall of the container when the cover is applied to the open end of the container; and
   means for locking said cover on said container in position to cover said open end, whereby to enclose said storage compartment and the contents thereof.

9. Storage apparatus for a spare tire assembly having a wheel rim and a hub fastened to a plurality of fasteners to mount the spare tire assembly on the exterior of a vehicle, said apparatus comprising:
   a storage container having a size to fit within the rim and a hollow interior presenting a storage compartment, said container having an open end providing access to said storage compartment;
   a closed end of said container opposite said open end and having means for receiving said fasteners in a manner permitting the fasteners to secure said closed end to said hub to mount the container within the rim of the spare tire assembly;
   a cover for said container having a size to cover said open end thereof to enclose said storage compartment and said fasteners; and
   releaseable means for securing said cover on said container to cover the open end thereof.

10. Apparatus as set forth in claim 9, wherein said releaseable means comprises key operated locking means having a locking condition wherein said cover is locked on said container and a release condition permitting removal of said cover from said container.

11. Apparatus as set forth in claim 9, wherein
   said container includes a wall adjacent said open end;
   said cover includes a cover panel for covering said open end of the container and a flange on the cover panel for overlapping said wall; and
   said securing means includes means for locking said cover panel to said container with said flange overlapping said wall of the container.

12. Apparatus as set forth in claim 11, including a plate on said container adjacent said open end thereof, said plate having an edge portion engageable to said locking means to lock the cover panel to said container.

13. Apparatus as set forth in claim 12, including means on said flange and side wall cooperating to position said cover panel in a preselected orientation on said container to locate said locking means at a preselected position for engagement with said edge portion of said plate.

14. Apparatus as set forth in claim 12, wherein, said locking means includes a key operated lock secured to said cover panel and including a movable locking element having a locking position and a release position, said locking element being engageable with said upper edge portion of said plate in the locking position to lock said cover panel to said container and being released from said plate in the release position to permit removal of said cover from the container to provide access to said storage compartment.

15. Apparatus as set forth in claim 9, including a flexible tire cover for covering the spare tire assembly, said releaseable means being operable to lock said cover to said container and to lock said tire cover to the spare tire assembly.

16. Apparatus for attachment to a spare tire assembly mounted on the exterior of a vehicle and having a wheel rim to which a spare tire is mounted, said apparatus comprising:
   a container having a size to fit within the wheel rim, said container having a hollow interior providing a storage compartment and an open end providing access to said storage compartment when uncovered;
   means for mounting said container within the wheel rim with said open end of the container exposed to provide access to said storage compartment;
   a cover panel for said container sized to cover said open end thereof to enclose said storage compartment;
   a flexible tire cover for covering the spare tire assembly and said cover panel; and
   locking means for locking said cover panel on said container and for locking the tire cover to said cover panel with the tire cover covering the spare tire assembly, said locking means being accessible for release thereof to release the tire cover and cover panel.

17. Apparatus as set forth in claim 16, including:
   a plate on said container for engagement by said locking means; and
   a movable locking element on said locking means having a locking position wherein the locking element and plate are interlocked to lock the cover panel and tire cover on the container and a release position wherein the locking element is released from said plate to permit removal of the cover panel and tire cover from said container.

18. A storage device for installation on a spare tire assembly mounted on the exterior of a vehicle and having a wheel rim, said device comprising:
   a rigid container having a hollow interior presenting a storage compartment and an open end providing access to said storage compartment, said container having sufficient size to hold and store loose articles such as tools and said container having a size and shape to fit closely within the wheel rim;
   means for securing said container to said spare tire assembly at a location within the wheel rim and with said open end at an accessible location to permit the loose articles to be inserted into and removed from said container through said open end;
   a cover for said container having a size to cover the open end thereof to enclose said storage compartment and the contents thereof; and
   means for locking said cover on said container in position to cover said open end, whereby to enclose said storage compartment and the contents thereof.

19. The device of claim 18, wherein:
said container includes a generally cylindrical wall adjacent said open end; and
said cover includes a generally circular cover panel and a peripheral flange on said cover panel overlapping said wall of the container when the cover is locked on said container.

* * * * *